Patented Feb. 16, 1926.

1,573,738

UNITED STATES PATENT OFFICE.

CARL OECHSLIN, OF PARIS, FRANCE, ASSIGNOR TO ETABLISSEMENTS POULENC FRERES, OF PARIS, FRANCE.

PREPARATION OF ORGANIC DERIVATIVES OF TIN.

No Drawing.   Application filed September 4, 1924. Serial No. 735,870.

*To all whom it may concern:*

Be it known that I, CARL OECHSLIN, a citizen of the Republic of Switzerland, residing at Paris, in the Republic of France, have invented certain new and useful Improvements in the Preparation of Organic Derivatives of Tin, of which the following is a specification.

J. Meyer (B, 16. 1442) was the first to demonstrate the formation of an alkyl-stannonic acid in the reaction of methyl iodide upon an aqueous solution of sodium stannite. More recently, Druce (J. Ch. Soc. 113, 715; 119, 758; 1922, 1859) prepared other alkyl-stannonic acids by applying this method to ethyl iodide, isopropyl iodide and the like.

I observed that another class of aliphatic halides have the property of forming organic derivatives of tin by their action upon stannite of sodium, these being the aliphatic halohydrins, which contain, in the same carbon chain, one or more halogens and one or more hydroxyl groups. I am aware of the facility with which the chlorhydrins are saponified by sodium hydroxide even in the diluted state, and also of the fact sodium hydroxide may further act upon the chlorhydrins with formation of oxide derivatives. For this reason, nothing led one to suppose that the action between the chlorhydrins and sodium stannite would be directed towards the substitution and not towards the saponification.

In consequence, the new organic derivatives of tin represent stannonic acids which contain upon the organic group one or more alcoholic functions.

The major part of the new derivatives of tin are found to differ from the known derivatives by their solubility in water.

They are more difficult to isolate in the pure state; they are also much less stable than the alkyl-stannonic acids, and will decompose at relatively low temperatures and in the presence of acids, and chiefly strong acids even in the cold state.

The sulphides of the hydroxyalkyl-stannonic acids have a white colour like the sulphides of the alkyl stannonic acids, but while the former are relatively stable, the latter become rapidly converted in the presence of acids into sulphides or oxysulphides of tin. The same transformation appears to take place at relatively low temperatures.

*Example 1.*—A solution of 225 grammes of stannous chloride in 380 c. c. of water is added slowly and without stirring to 500 c. c. of caustic soda solution at 36° Bé. which has been cooled by adding 300 grammes of ice. When the same is dissolved, 80.5 grammes of ethylene chlorhydrin are poured in. The stannous acid now disappears, and the new derivative is formed having the formula:

$$HO.CH_2.CH_2.Sn.O_2Na$$

The reaction may be represented as follows:

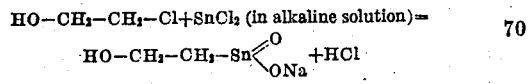

On completing the reaction, the product may be separated in various ways. It is preferably isolated in the form of its sulphuretted derivative, this being less soluble in water than the original substance. For this purpose, it is precipitated by chloride of barium, then saturated with hydrogen sulphide, neutralized and allowed to stand over night. After a new filtration, acetic acid will precipitate the hydroxy-ethyl-thiostannonic acid in the form of a light mass of a white colour.

The formula of the sulphur derivative is:

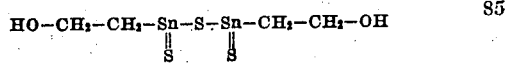

When treated in the centrifugal apparatus and dried at the room temperature it appears as a white powder which is but slightly soluble in water but is readily soluble in the alkalies, and even in sodium carbonate. It has no melting point, but decomposes at about 80° C., liberating a great quantity of gas which corresponds by volume to one equivalent of ethylene. The residue has a yellow colour and is free from carbon. The usual acids, even diluted, will decompose the same with disengagement of gas.

*Example 2.*—A solution of 225 grammes of stannous chloride in 225 c. c. of water is slowly added to 500 c. c. of caustic soda solution at 36° Bé. After the same has been dissolved 155 grammes of mono-bromohydrin of glycerin is poured into the alkaline solution. The stannite of sodium now disappears, with formation of dihydroxypropyl-stannonic acid, which may be separated in the form of its sulphuretted derivative according to the method indicated in Example 1. The dihydroxy-propyl-thiostannonic acid is a white powder which is but slightly soluble in water and soluble in sodium carbonate and in free alkalies, and also in the usual acids, but it rapidly becomes decomposed in these solutions. No melting point is found, but the substance is decomposed by heat into oxysulphide of tin.

Having now particularly described and ascertained the nature of my said invention and in what manner the same is to be performed, I declare that what I claim is:—

1. The process which comprises treating a chlorhydrin with stannous chloride in the presence of an alkali metal hydroxide.

2. The process which comprises treating a chlorhydrin with stannous chloride in the presence of sodium hydroxide.

3. The process which comprises treating an ethylene chlorhydrin with stannous chloride in the presence of an alkali metal hydroxide.

4. The process which comprises treating an ethylene chlorhydrin with stannous chloride in the presence of sodium hydroxide.

5. The process which comprises treating ethylene chlorhydrin with stannous chloride in the presence of an alkali metal hydroxide.

6. The process which comprises treating ethylene chlorhydrin with stannous chloride in the presence of an alkali metal hydroxide and isolating the product in the form of its stable sulphur derivatives by treating the precipitated hydroxy alkyl stannonic acid derivative with hydrogen sulphide.

7. As new products, hydroxy ethyl stannonic acids having the probable formula:

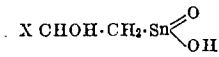

where X may be a hydrogen or a $-CH_2OH$ group.

8. As a new product hydroxy ethyl stannonic acid having the probable formula:

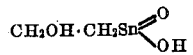

In testimony whereof I affix my signature.

CARL OECHSLIN.